Figures 1, 2:
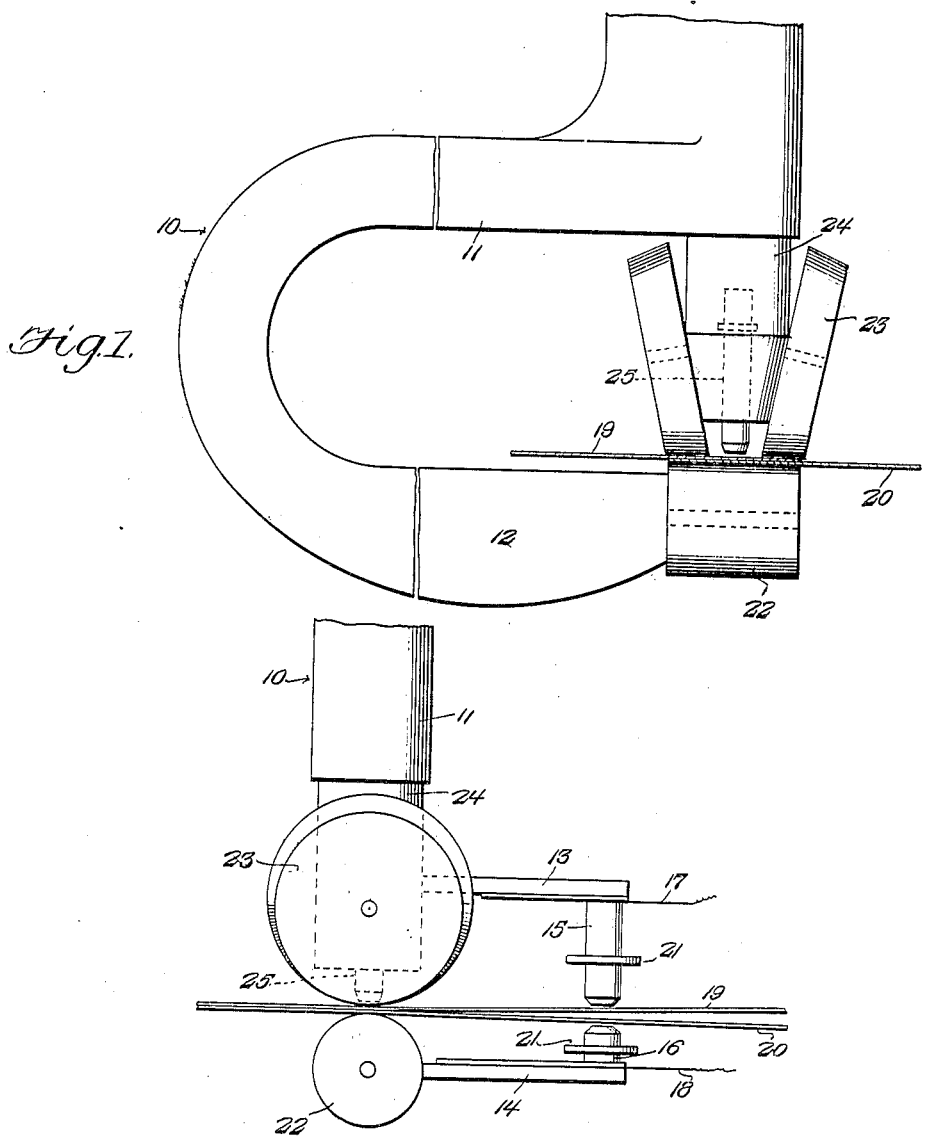

C. H. S. MacLENNAN.
METHOD OF AND APPARATUS FOR SPOT WELDING.
APPLICATION FILED APR. 10, 1918.

1,287,376.

Patented Dec. 10, 1918.

Witnesses

Inventor
C.H.S.M°Lennan,
By Victor J. Evans
Attorney

UNITED STATES PATENT OFFICE.

CHARLES H. S. MacLENNAN, OF SAN FRANCISCO, CALIFORNIA.

METHOD OF AND APPARATUS FOR SPOT-WELDING.

1,287,376.   Specification of Letters Patent.   Patented Dec. 10, 1918.

Application filed April 10, 1918. Serial No. 227,767.

*To all whom it may concern:*

Be it known that I, CHARLES H. S. MACLENNAN, a citizen of the United States, residing at San Francisco, in the county of San Francisco and State of California, have invented new and useful Improvements in Methods of and Apparatus for Spot-Welding, of which the following is a specification.

This invention relates to the method of joining two pieces of metal together by what is generally known as electric spot welding.

In spot welding it is practically impossible to successfully join together two thick metal plates, such as is used in marine vessel construction, owing to the heat spreading through the body of the metal from the highly heated welding spot, causing the plate to warp or buckle to such a degree as to prohibit the use of spot welding for this purpose.

Various other disadvantages are known to those familiar with the art and in order to overcome the same it is the purpose of the present invention to provide a method of spot welding in which the metal plates to be joined are securely clamped in such manner as to prevent them from separating during the period of time that the heated spot of metal remains in a plastic state and to prevent the plates from warping or buckling by confining the heat to the particular spot to be welded, a cooling agent acting upon the surface of the metal immediately surrounding the spot. This results in keeping the two plates alined and in close contact so as to permit of their use in any manner desired, such as in the construction of ships and for various other purposes.

In the drawings:—

Figure 1 is an end view of a machine illustrating one manner of carrying out the herein described method of electric spot welding; and Fig. 2 is a view at right angles to Fig. 1.

In the method of electric spot welding about to be described, various machines and mechanisms may be used, the machine illustrated in the accompanying drawings and later described being only one of many ways for carrying out the method and it is distinctly understood that this method is shown for purposes of illustration.

In the drawings the numeral 10 indicates the frame of a riveting machine which may be of any suitable construction and includes an upper jaw 11 and a lower jaw 12. Extending laterally from the upper jaw 11 is an arm 13, while a similar arm 14 extends from the lower jaw, both arms being in vertical alinement. Carried by the outer end of each of the arms 13 and 14 are electrodes 15 and 16 respectively, such as is usually employed in spot welding, these electrodes being spaced apart to permit of the insertion therebetween of the metal to be joined together. The arms 13 and 14 are capable of adjustment, so that the distance of the electrodes 15 and 16 from the jaws 11 and 12 may be regulated. This method of regulation of the distance between the jaws 11 and 12 and the electrodes 15 and 16 may be accomplished in various other ways, than through the adjustment of the arms 13 and 14, the purpose being to secure an adjustment of the electrodes with respect to the hammer point.

The metal plates to be joined are inserted between the electrodes 15 and 16 in the usual manner, current being supplied from any suitable source (not shown) through conductors 17 and 18 for the purpose of supplying the desired heat. The electrodes 15 and 16 are maintained in their spaced relation throughout the process of welding, the plates 19 and 20 being acted upon remaining more or less spaced apart as shown, so that the current will form an arc between the plates, thereby intensifying the heat and materially lessening the time required for bringing the metal to a welding heat. In order to confine the heated area, the portion of the plates 19 and 21 immediately surrounding the spot to be welded is acted upon by a cooling agent, which may be in the form of a liquid, gas or other suitable means, the cooling agent being supplied in the method herein shown by means of an annulus 21, which surrounds each of the electrodes 15 and 16. The cooling agent may be supplied to the annulus 21 by any suitable means, for example through a passage in each of the electrodes and the annulus may be hollow and provided with perforations for the escape of the cooling agent.

During the process of heating the plates 19 and 20, they are held securely clamped together through suitable clamping members, for example a horizontal roller 23 carried by the jaw 12 and vertically inclined rollers 23, supported upon a sleeve or cylinder 24 carried by the upper jaw 11. The plates 19 and 20 are thus securely held in the position in which they are to be welded, by the clamps 22 and 23, being subjected to the heat from the electrodes while in this clamped position. After being properly heated the plates are advanced until the heated spot lies between the rollers 23 and above the rollers 22, where the heated spot in the metal is acted upon by a suitable hammer or striking element 25, the latter being positioned between the rollers 23 and diametrically above the rollers 22. This period of clamping remaining in effect until the metal looses its plasticity and sets, which prevents buckling or warping by keeping the plates in close contact while the spot is in a heated plastic state.

As before stated various other machines or mechanisms may be devised for carrying out the foregoing described method of electric spot welding, the right is reserved to use any machine or mechanism adapted for the purpose.

Having described the invention, what is claimed is:—

1. A spot welding apparatus embodying oppositely disposed electrodes spaced apart for action upon the metal or plates to be welded, means for confining the area heated by the electrodes, means for delivering a blow to the heated area to weld the plates and means for holding the plates in close contact while the latter is in a heated plastic state.

2. A spot welding apparatus embodying oppositely disposed electrodes spaced apart for action upon the metal or plates to be welded, means for confining the area heated by the electrodes, means for delivering a blow to the heated area to weld the plates and clamping means for holding the plates in close contact while the latter is in a heated plastic state.

3. A spot welding apparatus embodying oppositely disposed electrodes spaced apart for action upon the metal or plates to be welded, means for confining the area heated by the electrodes, means for delivering a blow to the heated area to weld the plates and clamping means located adjacent the blow delivering means for holding the plates in close contact while the latter is in a heated plastic state.

4. A spot welding apparatus embodying oppositely disposed electrodes spaced apart for action upon the metal or plates to be welded, means for supplying a cooling agent to the area surrounding the heated spot to prevent spreading of the area heated by the electrodes, means for delivering a blow to the heated area to weld the plates and means for holding the plates in close contact while the latter is in a heated plastic state.

5. The method of electric spot welding consisting of subjecting the metal pieces to be joined to heat from opposite electrodes, of subjecting the metal surrounding the area being heated to a cooling agent to confine the heated area, of clamping the metal pieces securely together at points adjacent the heated surface until the metal is set and of subjecting the heated area to a pressure or blow to weld the metal at this spot.

6. The method of electric spot welding consisting of subjecting the metal pieces to be joined to heat from opposite electrodes, of subjecting the metal surrounding the spot to be heated to a cooling agent to confine the heated area, of clamping the metal plates securely together to hold the same in close contact while in a heated plastic state and of subjecting the heated area to a blow within the clamping area to weld the metal together at the heated spot.

In testimony whereof I affix my signature.

CHARLES H. S. MacLENNAN.